June 20, 1961   E. G. BRADNER   2,988,951
SHEET METAL NUT WITH ARCHED SCREW RECEIVING
MEANS AND LATCHING FLANGES
Filed April 23, 1959

INVENTOR.
ERNEST G. BRADNER
BY
Malcolm W. Fraser
ATTORNEY

United States Patent Office 2,988,951
Patented June 20, 1961

2,988,951
SHEET METAL NUT WITH ARCHED SCREW RECEIVING MEANS AND LATCHING FLANGES
Ernest G. Bradner, Toledo, Ohio, assignor to Prestole Corporation, Toledo, Ohio, a corporation of Michigan
Filed Apr. 23, 1959, Ser. No. 808,340
2 Claims. (Cl. 85—32)

This invention relates to fasteners but more particularly to sheet metal nuts and an object is to produce a new and improved sheet metal nut formed from a single strip of sheet metal bent to provide opposed side walls having portions of screw threads formed therein, as by stamping, and having unique means for retaining and supporting the side walls in the desired position without the use of welding or other separate means.

Another object is to produce a sheet metal nut of unitary form provided with novel integral latching means for positioning and retaining the thread-containing parts.

A further object is to produce a sheet metal nut which is economical to manufacture and assemble on a quantity production basis; is sturdy and reliable in use and imparts the desired predetermined torque resistance to the applied screw; and is provided with the simple and efficient details of construction and assembly hereinafter set forth.

Other objects and advantages of the invention will hereinafter appear and, for purposes of illustration but not of limitation, an embodiment of the invention is shown on the accompanying drawings in which FIGURE 1 is an edge elevation of a sheet metal clip of the U type for engaging over the edge of a panel or the like and provided with nut means and showing a screw threadedly engaging same;

Figure 1:
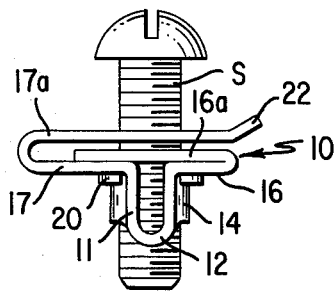
Figure 2:
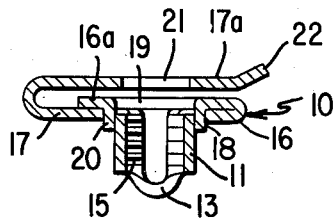
FIGURE 2 is a longitudinal sectional view of the clip without the screw.
Figure 3:
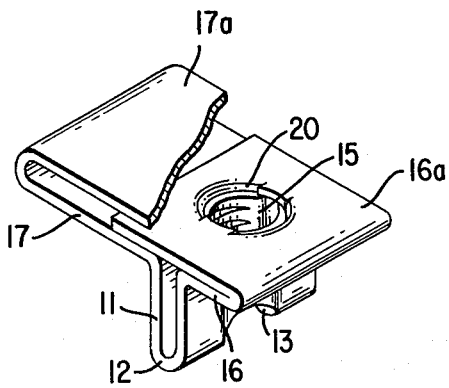
FIGURE 3 is an enlarged perspective view of the clip, a portion being broken away for purposes of clarity.

The illustrated embodiment of the invention comprises a screw receiving fastener which in this instance is in the form of a U clip well known in this art, the same being formed from a single strip of flat spring metal. The nut comprises flat side walls 11 which are in spaced facing generally parallel relation and are connected at the outer end by an integral arcuate end wall 12, there being a hole 13 centrally of the bend. Intermediate the edges of the side walls 11 and terminating at the outer hole 13 are outwardly arched longitudinally extending wall portions 14 in which are stamped thread portions 15, the opposing thread portions being such as threadedly to engage a screw S inserted therebetween. The structure is such as to create a spring action should this be desired for impinging against the threads of the applied screw S. By somewhat narrowing the space between the arched portions at the outer end for example increased resistance may be imposed on the screw S.

At the inner ends of the side walls 11 are integral oppositely extending integral aligned flanges 16 and 17, which are arranged at substantially right angles to the side walls 11. Formed in the flange portions 16 and 17 respectively at the base of the arched portions 14 are slots 18, the inner edges of which are arcuate conforming to the arched portions 14. The flange 16 is bent upon itself to provide an outer ply 16a flatwise engaging the underside of the flange 16 and extending a substantial distance across the side walls 11 with the free end portion of the ply 16a abutting a part of the underside of the flange 17. Formed in the outer ply 16a is a hole 19 aligned with the axis of the arched portions 14 and through which the screw S passes for threaded engagement with the stamped threads 15.

The edge of the hole 19 is formed with a pair of arcuate latching flanges 20 which project respectively through the slots 18 and abut against the outer sides of portions of the arched walls 14 respectively, the curvature of the flanges 20 being such as intimately to fit the respective arched portions 14. In this manner the flanges 20 not only back up the arched portions 14 and reinforce the same but also positively latch the arched portions 14 against lateral separating movement and insure that the stamped threads are in the proper position to receive and threadedly engage the screw S.

In this instance the flange 17 is folded upon itself forming an open loop and providing a parallel outer arm 17a which is formed with a hole 21 in registry with the hole 19 and through which the screw S passes. To facilitate the application of the clip to the supporting panel the free end of the arm 17a is outwardly inclined as indicated at 22.

From the above it will be manifest that I have produced an exceedingly simple and inexpensive sheet metal nut which has remarkable torque strength. The unique feature of latching together the opposed threaded arched side walls is important in effectively resisting lateral movement thereof and insuring proper threaded reception of the screw S. The latching device is extremely simple lending itself admirably to quantity production and obviates the necessity of welding or other more costly operations. The double thickness of metal at the base of the fastener as well as at the screw entering end of the threaded portions contribute greatly to the strength and stability of the structure.

It should be understood that although the drawings illustrate a U type clip, this is done merely by way of illustration because numerous other forms of clips or fasteners may be formed with the nut structure above described, such as J clips as well as those adapted for blind locations. Thus, numerous changes in details of construction, arrangement and adaptation may be made without departing from the spirit of the invention, especially as defined in the appended claims.

What I claim is:

1. A nut comprising a sheet metal body having spaced side walls, an outwardly arched portion on each side wall, said arched portions having a common axis, an integral apertured wall connecting the outer ends of said side walls, thread sections formed on each arched portion thereby threadedly to engage a screw inserted therebetween, an integral flange on the inner end of one side wall extending outwardly at right angles thereto, a return fold portion on said integral flange apertured to afford screw entry, said return fold being in substantial abutting contact substantially throughout the entire length thereof with the adjacent surface of said integral flange, a pair of integral latch elements on said return fold portion, one being arranged in the region of each side wall and said latch elements being arcuate in opposite directions and coaxial with said arched portions, and each arcuate latch element being on the outer side of and in engagement with one of the arched portions.

2. A sheet metal nut comprising a flat body portion bent upon itself to provide a pair of spaced apart substantially parallel side walls, an outwardly arched portion on each of said side walls, said arched portions having a common axis, an integral apertured wall connecting the outer ends of said side walls, thread sections formed on each arched portion of said side walls thereby threadedly to engage a screw insert therebetween, oppositely extending integral flange portions at the inner end of said side walls extending at right angles thereto, a slot in each of said flange portions adjacent the respective side wall, a return fold portion on one of said integral flange portions apertured to afford screw entry, said return fold being in substantial abutting contact substantially throughout the entire length thereof with the adjacent surface of said one integral flange, a pair of integral latch elements on said return fold portion extending into said slots respectively in each of said flange portions, one of said latch elements being arranged in the region of each of said side walls and being arcuate in opposite directions and coaxial with said arched portions, and each arcuate latch element being on the outer side of and in engagement with one of the arched portions.

References Cited in the file of this patent

UNITED STATES PATENTS

| | | |
|---|---|---|
| 2,370,375 | Simmons | Feb. 27, 1945 |
| 2,382,942 | Murphy | Aug. 14, 1945 |